United States Patent [19]

Simmons

[11] Patent Number: 4,550,515
[45] Date of Patent: Nov. 5, 1985

[54] X-RAY AND PHOTOGRAPHIC VIEWER

[76] Inventor: Robert N. Simmons, 30 N. Michigan Ave., Suite 1204, Chicago, Ill. 60602

[21] Appl. No.: 546,838

[22] Filed: Oct. 31, 1983

Related U.S. Application Data

[63] Continuation-in-part of Ser. No. 322,646, Nov. 18, 1981, Pat. No. 4,454,669.

[51] Int. Cl.[4] ............................................ G02B 27/02
[52] U.S. Cl. ..................................... 40/362; 40/367
[58] Field of Search ................. 40/361, 362, 364, 365, 40/366, 367; 353/68, 101

[56] References Cited

U.S. PATENT DOCUMENTS

| | | | |
|---|---|---|---|
| 2,983,061 | 5/1961 | Maiershofer | 40/365 |
| 3,064,376 | 11/1962 | Fuller | 40/362 |
| 4,094,598 | 6/1978 | Hodges | 353/101 X |
| 4,146,315 | 3/1979 | Pribich | 353/101 X |

FOREIGN PATENT DOCUMENTS

1008973  5/1952  France ................... 40/367

Primary Examiner—Robert P. Swiatek
Attorney, Agent, or Firm—Leydig, Voit & Mayer, Ltd.

[57] ABSTRACT

A portable transparency viewer including a body having a fixed imaging screen with a light source disposed therebehind within the viewer body. Also held within the viewer body is a selectively energizable power source for illuminating the imaging screen. An adjustable magnifier is pivotally attached to the viewer body overlying screen in movable and parallel spaced relation thereto. For viewing slides and filmstrips, an auxiliary removable magnifier is provided which is adapted to be releasably engaged and retained on the viewer body over the viewing screen. The auxiliary magnifier includes a slide carrier for selectively introducing slides between the lens of the auxiliary magnifier and the imaging screen of the viewer body. The auxiliary magnifier further includes an inlet and an outlet positioned on opposite sides of the housing so as to permit the passage of a filmstrip therethrough.

8 Claims, 6 Drawing Figures

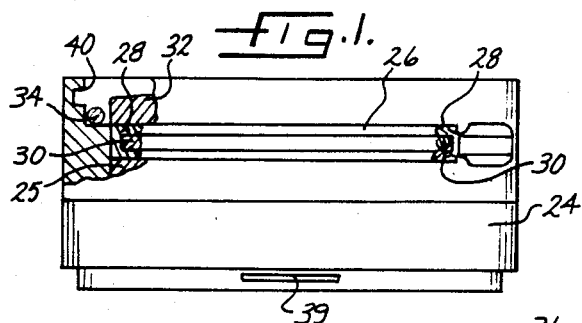
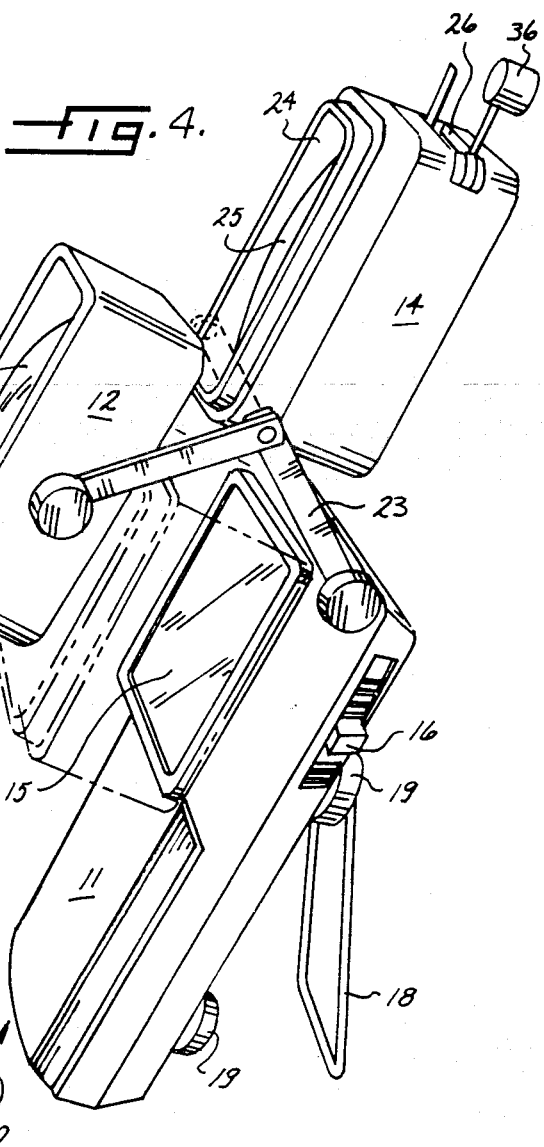
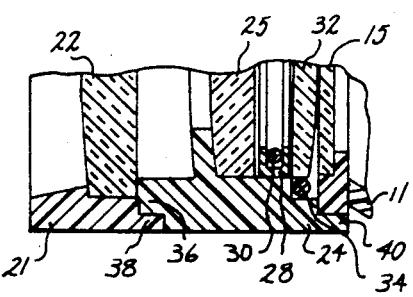
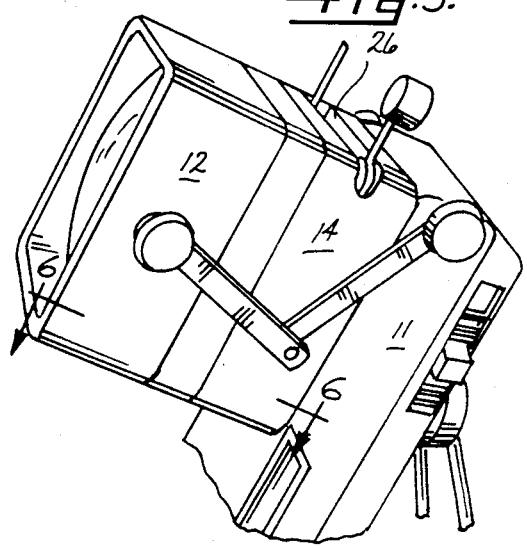

X-RAY AND PHOTOGRAPHIC VIEWER

This application is a continuation-in-part of my copending application, Ser. No. 322,646, filed on Nov. 18, 1981, now U.S. Pat. No. 4,454,669.

This application relates in general to a portable, hand-held, transparency viewer, and more particularly to a transparency viewer which includes an attachment that facilitates the viewing of slides and filmstrips.

As disclosed in my above-mentioned copending application, medical and dental professionals may be faced with situations where an electrical power source is not readily available and illuminated X-rays must be studied. Further, it is often required that the image of the illuminated X-ray or transparency be magnified so as to facilitate diagnosis. Thus, it is desirable to have a portable transparency viewer with a self-contained power source that also allows enlargement of the transparency's illuminated image.

Accordingly, in my above-referenced, copending application, I disclosed a portable transparent viewer particularly suited for the study of dental X-rays. The viewer includes a hand-held body with a fixed imaging screen, upon which a dental X-ray or the like is placed. A selectively energizable light source is disposed behind the imaging screen within the viewer body, and a magnifying lens is pivotally connected to the viewer body by means of linkage which permits the magnifying lens to be moved into an infinite number of positions closely adjacent to the imaging screen. To enhance the portability of the viewer, the magnifying lens can be positively and releasably engaged and retained to the surface of the imaging screen.

While this viewer accomplished its objects, it became desirable to increase the versatility of the portable viewer so as to permit the easy viewing of slides or filmstrips and the like. Thus, it is the primary object of the instant invention to provide a portable transparency viewer which can be used for slides and filmstrips, as well as transparencies such as dental X-rays.

It is a further object to provide such a viewer which facilitates the magnification of the transparency's illuminated image.

It is a related object of the instant invention to provide such magnifying means which may be secured to the portable viewer so as to facilitate storage and transporting.

Other objects and advantages will become apparent upon reference to the following detailed description and accompanying drawings, in which:

FIG. 1 is a front view, in partial section, showing an auxiliary magnifying device which forms a part of the present invention;

FIG. 2 is a top view of the auxiliary magnifying device shown in FIG. 1;

FIG. 3 is a back view of the auxiliary magnifying device;

FIG. 4 is a perspective view showing the cooperating elements of the instant invention;

FIG. 5 is a partial perspective view showing the portable viewer in its travel position; and FIG. 6 is a partial section taken substantially along the lines 6—6 in FIG. 5.

While the invention will be described in connection with its preferred embodiment, it is not intended to limit the invention to this particular embodiment. On the contrary, it is intended to cover the various alternative and equivalent constructions within the spirit and scope of the appended claims.

Turning to the drawings, FIG. 4 illustrates a transparency viewer, generally indicated by 10, of the instant invention. The viewer 10 includes a body portion 11, an adjustable magnifier 12, and an auxiliary magnifier 14. The body 11 and adjustable magnifier 12 are substantially as shown and described in my application, Ser. No. 322,646, now U.S. Pat. No. 4,454,669, which is herein incorporated by reference. The body 11 includes a fixed, translucent imaging screen 15, behind which is disposed a light source, preferably powered by rechargeable batteries held in the viewer body 11. For selectively energizing the light source, a switch 16 is disposed on the side of the body so as to facilitate single-hand holding of the viewer 10 and manipulation of the switch 16. For supporting the viewer 10 in a convenient viewing position, the body 11 includes a wire stand 18, which holds the viewer 10 in a substantially upright position, and a plurality of feet 19, which support the viewer 10 in a horizontal position.

For magnifying the illuminated image of a transparency which may be placed directly on the imaging screen 15, an adjustable magnifier 12 having a housing portion 21 and lens 22 is pivotally connected to the body 11 by means of scissoring links 23. The links 23 permit the positioning of the adjustable magnifier 12 between a transparency viewing position in parallel spaced relation to the imaging screen 15, and a travel position directly overlying the imaging screen 15. The adjustable magnifier 12 is positively and releasably retained on the body 11 over the imaging screen 15 by means of interfitting projections and recesses on the magnifier housing 21 and the viewer body 11.

In keeping with the invention, an auxiliary magnifier 14 is provided for use with the transparency viewer so as to allow the viewing of slides and filmstrips. The auxiliary magnifier 14 is removably positionable over the imaging screen 15 of the viewer body 11, as shown in phantom in FIG. 4, and includes a housing portion 24. A lens 25 is secured in the housing 24 so as to be spaced from the imaging screen 15 when the auxiliary magnifier 14 is positioned on the body 11.

For selectively introducing single slides into the housing 24 between the imaging screen 15 and the lens 25, the housing 24 has a slot 26 sized to receive a slide. Extending from the slot into the housing in parallel relation are two U-shaped channels 28. For inserting and removing slides into the slot 26, a slide carrier 29 cooperates with the U-shaped channels 28. The slide carrier 29 is preferably a wire member having two extending portions 30 connected by a cross-bar 31. To support a slide within the auxiliary magnifier 14, a transparent member 32 is disposed within the housing 24 between the slide carrier 29 and the imaging screen 15. The transparent member 32 is secured within the housing 24 by means of wedges 34 which engage the edges of the transparent member 32.

In further keeping with the invention, the housing 24 of the auxiliary magnifier 14 may be adapted to permit the viewing of filmstrips and the like. Accordingly, the housing 24 has a second slot 35 therethrough which is aligned with, and on the opposite side of the housing 24 from, the first slot 26 so as to allow access into the housing 24 between the lens 25 and the transparent member 32.

In use, slides may be viewed by placing a mounted slide between the uprights 30 of the slide carrier 29. To this end, the extending portions 30 of the slide carrier 29 may be bent slightly inward so as to squeezingly engage the sides of the slide mounting. The slide carrier 29 is then inserted into the slot 26 with the aid of a finger grip 36 secured to one of the extending portions 30. To remove the slide, the carrier 29 is pulled from the housing 24, thus causing the cross bar 31 to engage an edge of the slide and push the slide from the housing. For viewing filmstrips, the slide carrier 29 is simply removed from the auxiliary magnifier 14 and the filmstrip is threaded through the housing 24, with the slots 26 and 35 acting as either an inlet or an outlet for the filmstrip. The filmstrip is then manually fed through the auxiliary viewer 14.

In further keeping with the invention, the housing 24 of the auxiliary magnifier 14 is releasably interlockable with both the housing 21 of the adjustable magnifier 12 and the viewer body 11, thus positively locating the components of the viewer 10 in a compact travel position, as shown in FIG. 5. Accordingly, the housing 24 of the auxiliary magnifier 14 includes a ledge portion 36 which interfits with a lip 38 on the housing 21 of the adjustable magnifier 12. The ledge 36 includes protruding members 39 which interfit with recesses in the lip 38 of the housing 21 to positively and releasably secure the adjustable magnifier 12 to the auxiliary magnifier 14.

In a similar fashion, the housing 24 of the auxiliary magnifier 14 includes a lip 40 which overfits the body 11 when the auxiliary magnifier 14 overlies the imaging screen 15. The lip 40 and the cooperating portion of the viewer body 11 also contain means for selectively and positively interlocking the auxiliary magnifier housing 24 to the viewer body 11. Such means may include an interfitting protrusion and recess on the housing 24 and body 11 similar to 39, discussed above. Accordingly, the viewer body 11, the auxiliary magnifier 14 and adjustable magnifier 12 may be positively interlocked as shown in FIG. 5.

While the auxiliary magnifier 14 has been discussed in terms of a slide or film strip viewer, it is easily appreciated that the transparent member of the magnifier could be colored for use in viewing photographic negatives.

What is claimed is:

1. A portable transparency viewer for viewing X-ray film, photographic slides, filmstrips and like items, comprising, in combination, a viewer body having a fixed imaging screen upon which items to to viewed may be placed for direct viewing, a light source disposed behind the imaging screen within said viewer body, power means contained within said viewer body for permitting selective energization of said light means to illuminate said screen, first magnifying means, adjustable support means for positioning said first magnifying means in parallel spaced relation relative to said screen to permit magnified viewing of items disposed on said fixed imaging screen, and auxiliary removable magnifying means adapted for selected releasable engagement with said viewer body over said viewing screen and including means for receiving items between said auxiliary magnifying means and said screen so as to permit selective viewing of said received items directly through said auxiliary magnifying means as well as through both said first and auxiliary magnifying means.

2. The combination of claim 1 wherein said auxiliary magnifying means further comprises a housing and a magnifying lens secured in said housing, and said item receiving means includes means for selectively and removably inserting an item for viewing into said housing between said magnifying lens and said light source and an inlet and outlet positioned on opposite sides of said housing to permit the passage of a filmstrip therethrough.

3. The combination of claim 2 wherein the auxiliary magnifying means further comprises a transparent member secured in said housing so that said inserting means is located between said magnifying lens and said transparent member.

4. The combination of claim 2 wherein said inserting means fits into the inlet of the filmstrip passage.

5. The combination of claim 1 further comprising means for releasably engaging and retaining said first magnifying means to said auxiliary magnifying means.

6. A portable transparency viewer for viewing X-ray film, photographic slides, filmstrips and the like, comprising, in combination, a viewer body having a fixed imaging screen, a light source disposed behind the imaging screen within said viewer body, power means contained within said viewer body for permitting selective energization of said light means to illuminate said screen, first magnifying means, adjustable support means on said body supporting said first magnifying means for positioning said first magnifying means in parallel spaced relation relative to said screen, auxiliary removable magnifying means adapted to be releasably engaged and retained to said viewer body over said viewing screen, said auxiliary magnifying means including a housing and a magnifying lens secured in said housing, and said auxiliary magnifying means further including means for selectively and removably inserting a slide into said housing between said magnifying lens and said light source and an inlet and outlet positioned on opposite sides of said housing to permit the passage of a filmstrip therethrough for enabling selective viewing of slides and filmstrips.

7. The combination of claim 6 wherein the auxiliary magnifying means further comprises a transparent member secured in said housing so that said means for selectively and removably inserting a slide is located between said magnifying lens and said transparent member.

8. The combination of claim 6 wherein said slide-inserting means fits into the inlet of the filmstrip passage.

* * * * *